United States Patent
Henneberg Rysgaard et al.

(10) Patent No.: US 9,060,371 B2
(45) Date of Patent: Jun. 16, 2015

(54) COMMUNICATION NETWORK COMPONENT, COMMUNICATION DEVICES, METHOD FOR TRANSMITTING DATA AND METHODS FOR DATA COMMUNICATION

(71) Applicants: Bent Henneberg Rysgaard, Aalborg Oest (DK); Henrik Dalsgaard, Storvorde (DK)

(72) Inventors: Bent Henneberg Rysgaard, Aalborg Oest (DK); Henrik Dalsgaard, Storvorde (DK)

(73) Assignee: INTEL MOBILE COMMUNICATIONS GMBH, Neubiberg (DE)

( * ) Notice: Subject to any disclaimer, the term of this patent is extended or adjusted under 35 U.S.C. 154(b) by 198 days.

(21) Appl. No.: 13/756,634

(22) Filed: Feb. 1, 2013

(65) Prior Publication Data

US 2014/0220992 A1   Aug. 7, 2014

(51) Int. Cl.
*H04W 24/00* (2009.01)
*H04W 72/04* (2009.01)

(52) U.S. Cl.
CPC .................................. *H04W 72/048* (2013.01)

(58) Field of Classification Search
USPC ................. 455/458, 558, 445, 552.1, 434; 370/312, 252, 336, 328
See application file for complete search history.

(56) References Cited

U.S. PATENT DOCUMENTS

| | | | |
|---|---|---|---|
| 2008/0261603 A1* | 10/2008 | Sever et al. | 455/445 |
| 2010/0222104 A1* | 9/2010 | Lee | 455/558 |
| 2011/0077003 A1* | 3/2011 | Shin | 455/434 |
| 2011/0206016 A1* | 8/2011 | Denteneer et al. | 370/336 |
| 2011/0310784 A1* | 12/2011 | Park | 370/312 |
| 2013/0005394 A1* | 1/2013 | Geary et al. | 455/552.1 |
| 2013/0034012 A1* | 2/2013 | Oshiba | 370/252 |
| 2014/0228070 A1* | 8/2014 | Josso et al. | 455/552.1 |

* cited by examiner

*Primary Examiner* — Wayne Cai

(57) ABSTRACT

A communication network component is described including a determiner configured to determine whether a communication device operates a plurality of subscriber identity modules; and a controller configured to control data transmission to the communication device depending on whether the communication device operates a plurality of subscriber identity modules.

21 Claims, 9 Drawing Sheets

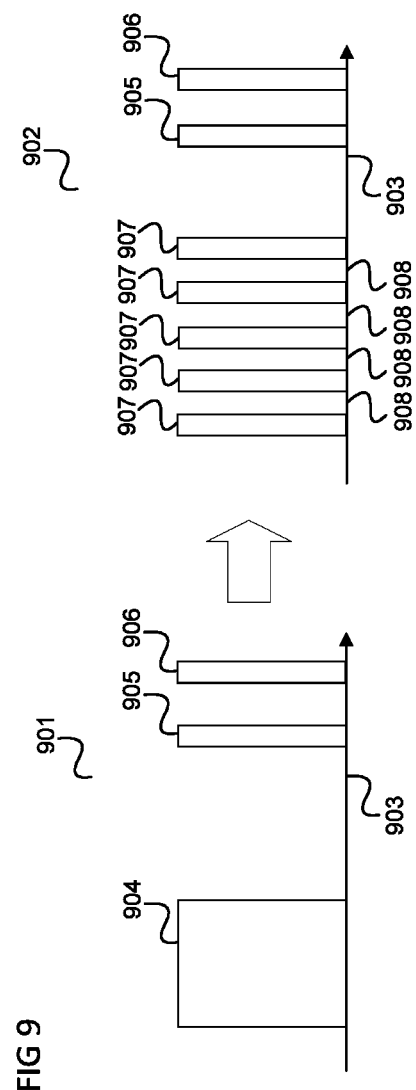

COMMUNICATION NETWORK COMPONENT, COMMUNICATION DEVICES, METHOD FOR TRANSMITTING DATA AND METHODS FOR DATA COMMUNICATION

TECHNICAL FIELD

The present disclosure relates to a communication network component, communication devices, a method for transmitting data and methods for data communication.

BACKGROUND

When operating a communication device the case may occur that the reception of two sets of information, which should both be received by the mobile communication device, has a conflict, e.g. due to the collision of the transmission timing of the two sets of information. For example, a communication terminal including two SIMs (Subscriber Identity Modules) which are in service in parallel may receive information from one base station for one of the SIMs while another base station for the other of the SIMs also sends information to the communication device. It is desirable to ensure that both sets of information are successfully transmitted to the communication device.

SUMMARY

A communication network component is provided including a determiner configured to determine whether a communication device operates a plurality of subscriber identity modules and a controller configured to control data transmission to the communication device depending on whether the communication device operates a plurality of subscriber identity modules.

Further, a communication device is provided including a message generator configured to generate a message indicating that the communication device operates a plurality of subscriber identity modules and a transmitter configured to transmit the message to a radio communication network.

Further, a communication device is provided including a transmitter configured to transmit a message indicating that a data transmission to the communication device should include successive transmissions of a plurality of data blocks, wherein between the transmissions of every two data blocks, there is a time interval of a predetermined minimum length and a controller configured to receive the data transmission via a communication channel and to pause receiving via the communication channel during the time intervals between two data blocks.

Further, a method for transmitting data and methods for data communication according to the communication network component and the communication devices described above are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 9 shows transmission diagrams.

DESCRIPTION

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects.

Figure 1:
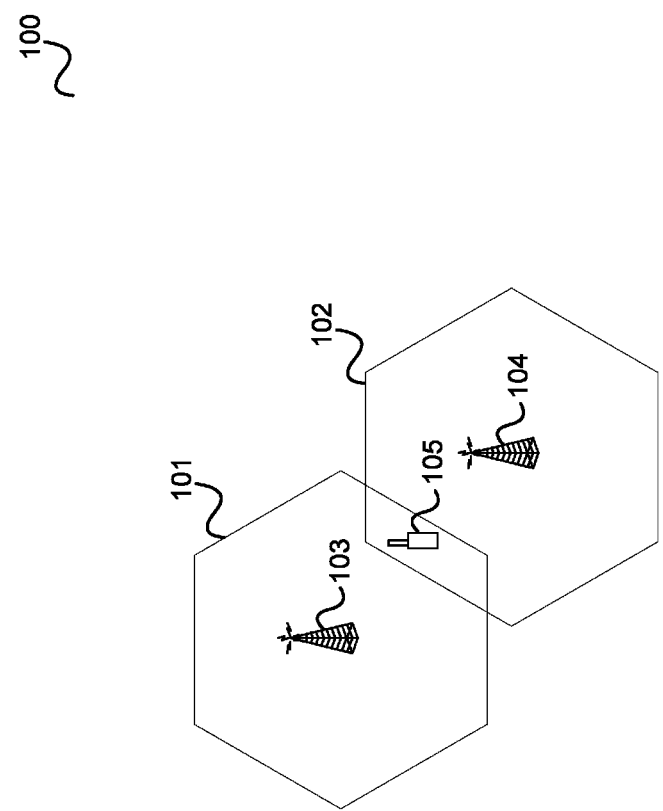
FIG. 1 shows a communication arrangement.

FIG. 1 shows a communication arrangement 100.

The communication arrangement 100 includes a first radio cell 101 and a second radio cell 102. The first radio cell 101 is operated by a first base station 103 and the second radio cell 102 is operated by a second base station 104. The first base station 103 is for example part of a radio access network of a first mobile communication network and the second base station 104 is for example part of a radio access network of a second mobile communication network. It is assumed that the first mobile communication network and the second communication network are different mobile communication networks, e.g. are operated by different operators and/or require separate subscriptions.

The first mobile communication network and the second mobile communication network each may for example be a GSM (Global System for Mobile Communications) communication system, a UMTS (Universal Mobile Telecommunications System), a CDMA2000 (CDMA: Code Division Multiple Access) communication system, an LTE (Long Term Evolution) communication system or a FOMA (Freedom of Mobile Access) communication system.

The first radio cell 101 and the second radio cell 102 are assumed to overlap such that a mobile terminal 105 located in the overlap area of the first radio cell 101 and the second radio cell 102 can receive signals from both the first base station 103 and the second base station 104 and can use both the first communication network and the second communication network for communication.

For being able to use both the first communication systems and the second communication system, the mobile terminal 105 may include two (or more) subscriber identity modules, e.g. SIMs or USIMs (Universal Subscriber Identity Modules). In other words, the mobile terminal 105 may be a multi-SIM device supporting communication via two (or more) different mobile communication networks.

The mobile terminal 105 is for example a multi-SIM device with only one RF (radio frequency) receiver. This means that the mobile terminal 105 is only able to receive data from either the first base station 103 or the second base station 104 at a time. For example, the mobile terminal 105 is only able to tune to a communication channel of either the first base station 103 or the second base station 104 at a time and/or is only able to tune to either the frequency range used by the first base station 103 for operating the first radio cell 101 or the frequency range used by the second base station 104 for operating the second radio cell 102. An RF receiver may be understood as a component of the mobile terminal 105 performing the reception processing of signals received via an antenna of the mobile terminal 105 processing up to including conversion into base band.

The mobile terminal 105 may for example include a first SIM for using the first communication network and a second SIM for using the second communication network.

Mobile operators are focused on providing the best service to mobile users and making sure that when using a service, the best possible setup is used. For users, multi SIM devices offer the potential to improve the usage/cost ratio. Ideally, a device would be capable of connecting to multiple networks or providers at the same time (using one SIM per network or provider) and always maintain connectivity. However, download traffic patterns for many popular applications may contain large concentrated amounts of data, for example during status update or during e-mail download. During data download on one SIM the other SIMs may be blocked from communication (e.g. in case of a device with only one RF receiver). Thus, the communication device and may lose connection to one or more of the networks associated with the other SIMs.

A communication device with support for more than one SIM card can be built in a number of ways. As an example of a multi-SIM terminal, it is assumed in the following that the mobile terminal 105 is a dual-SIM terminal. However, the following may be applied also to a multi-SIM terminal with a higher number of SIMs.

For example, the mobile terminal 105 is a Dual SIM-Dual Standby (DSDS) terminal. This means that both of the two SIM cards of the mobile terminal 105 are connected to the network (e.g. to a respective network, e.g. a first SIM to the first base station 103 and a second SIM to the second base station 104) in stand-by mode, and both SIMs are able to receive incoming calls while in stand-by. But whenever a connection is initiated on, e.g., the first SIM card the second SIM card may be blocked from radio communication and may lose its network connection. When the connection of the first SIM card is closed again, the second SIM card may go back onto the network (i.e. reconnect to its associated network). Supporting two SIM cards with one RF receiver may for example be done by time-multiplexing between the two SIM cards, since the RF receiver can only receive the signal on one channel at a time. This may however lead to a large number of conflicts where typically there is some prioritization between communication requests of the two SIM cards. A typical example from 3G UMTS is that if the paging signals (i.e. indications from the networks to devices about which devices should set up some kind of connection—e.g. an audio call) for the SIMs overlap in time. Then a decision is typically made on which paging to prioritize. Schemes can be introduced to enable the device 105 to handle each conflict in the best possible way.

Producers of mobile phones have seen a sudden rise among end users for support of more than one SIM card in their devices. According to market researches it can be expected that 20% of all mobile devices in operation will be dual-SIM devices by 2015. The requirement is mainly seen in emerging markets like China and India, but other markets are beginning to see an increase in demands for multi SIM support as well.

Further, users have an increasing demand for applications such as social networks, email, news tickers and many more. A number of these applications are background applications that perform downloads of data without the user being involved. A background data download for one SIM in a dual-SIM device may lead to the other SIM card to be out of service during the download (e.g. to be unreachable by paging) or forces gaps in the data download that may cause re-transmissions of data, thereby increasing demand for data traffic on networks. Since the user may not even be aware of the download the user may have no knowledge or understanding for the other SIM being out of service.

Accordingly, a user may eventually lose an incoming call without knowing the reason for the lost call. Thus, the user may eventually experience the other SIM card losing connection to the network without knowing the reason.

In the following, devices and methods are described that address this issue and in particular enable operators to improve end user experience running data heavy applications on multi-SIM devices.

Figure 2:
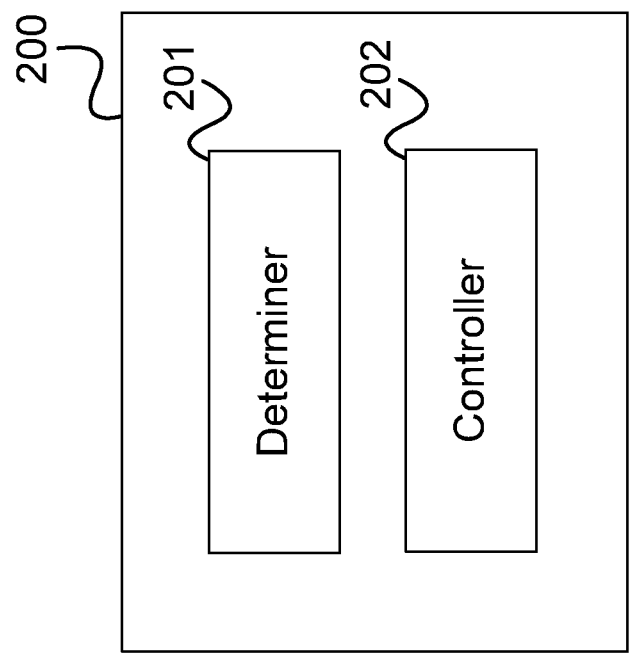
FIG. 2 shows a communication network component.

FIG. 2 shows a communication network component 200.

The communication network component 200 (e.g. a communication network device) includes a determiner 201 configured to determine whether a communication device operates (i.e. uses) a plurality of subscriber identity modules.

Further, the communication network component 200 includes a controller 202 configured to control data transmission to the communication device depending on whether the communication device operates a plurality of subscriber identity modules.

In other words, the network side adapts data transmission to the communication device in response to the communication device being detected to be a multi-SIM (e.g. a dual-SIM) communication device.

The communication network component may for example determine that the communication device operates a plurality of subscriber identity modules based on the communication device adding signaling information to control signals that it sends to the network which allow the network to recognize the communication device for example as a multi-SIM device (for example a dual-SIM mobile device). In other words, signaling is used to recognize multi-SIM mobile devices (for example dual-SIM mobile devices) in mobile networks. In response of recognizing a communication device as a multi-SIM mobile device the air interface traffic to the communication device may be adapted, e.g. in view of radio behavior of the device or the network associated with one of the SIMs (e.g. paging intervals of a network associated with one of the SIMs). A radio communication network may be understood as being associated with a subscriber identity module if the subscriber identity module identifies the communication device as a subscriber of the radio communication network and which has for example been issued by the operator of the radio communication network.

As an example for adapting a data transmission the network (i.e. the communication network component) may for example use this information to guide application downloads through a network proxy (i.e. proxy server) taking care of chopping large data blocks into small blocks before being sent over the air to the communication device. Thus, it can for example be avoided that a user of a multi-SIM mobile device experiences drawbacks from lost service or lost incoming calls due to applications blocking the radio for many seconds or even minutes.

The communication network component may further include a receiver configured to receive a message indicating whether the communication device operates a plurality of subscriber identity modules wherein the determiner is for example configured to determine whether the communication device operates a plurality of subscriber identity modules based on the message.

For example, the communication network component further including a receiver configured to receive a message indicating that the communication operates a plurality of subscriber identity modules wherein the determiner is configured to determine that the communication operates a plurality of subscriber identity modules in response to the reception of the message.

The message is for example a control message, for example including control information related to the usage of the radio communication network of which the communication network component is part by the communication device.

For example, the message is a location area update message.

The message may for example also be a registration message for registering one of the subscriber identity modules in a radio communication network, e.g. in the radio communication network of which the communication network component is part. Such a registering message is for example sent upon power up of the communication device to make the presence of the communication device known to the radio communication network.

The controller may for example be configured to control data transmission according to a predetermined criterion in response to the determination that the communication device operates a plurality of subscriber identity modules.

The predetermined criterion for example depends on a characteristic of a radio communication network associated with one of the subscriber identity modules.

The controller is for example configured to, in response to the determination that the communication device operates a plurality of subscriber identity modules, control a data transmission to the communication device to include the successive transmissions of a plurality of data blocks, wherein the duration of each transmission has a predetermined maximum duration.

For example, the data transmission is a data transmission for one subscriber identity module of the plurality of subscriber identity modules and the predetermined maximum duration is the length of the paging repetition interval times the number of repetitions of a paging message associated with another of the subscriber identity modules of the plurality of subscriber identity modules.

The controller may also be configured to, in response to the determination that the communication device operates a plurality of subscriber identity modules, control a data transmission to the communication device to include the successive transmissions of a plurality of data blocks, wherein between the transmissions of every two data blocks, there is a time interval of a predetermined minimum length.

For example, the data transmission is a data transmission for one subscriber identity module of the plurality of subscriber identity modules and the predetermined minimum length is the length of the paging repetition interval times the number of repetitions of a paging message associated with another of the subscriber identity modules of the plurality of subscriber identity modules.

The data blocks may for example have a predetermined maximum transmission duration. For example, in case data throughput is reduced, the size of the data blocks is also reduced to stay below the maximum transmission duration.

The controller is for example configured to, in response to the determination that the communication device operates a plurality of subscriber identity modules, merge a plurality of shorter data transmissions to a larger data transmission.

The controller may be configured to, in response to the determination that the communication device operates a plurality of subscriber identity modules, control a data transmission to the communication device to be carried out via a proxy server. The proxy server for example adapts the data transmission according to one of the described schemes (e.g. separation into segments, merging into a larger data transmission, inclusion of additional information etc.)

The controller may be configured to, in response to the determination that the communication device operates a plurality of subscriber identity modules, control a data transmission to be performed for a subscriber identity module of the plurality of subscriber identity modules to be performed using a communication channel that is not used for communication with another subscriber identity module of the plurality of subscriber identity modules.

Each subscriber identity module of the plurality of subscriber identity modules for example identifies the communication device as a subscriber of a radio communication network associated with the subscriber identity module.

The radio communication networks associated with the subscriber identity modules of the plurality of subscriber identity modules are for example different. Alternatively, the subscriber identity modules may be associated with the same radio communication network.

The communication device is for example a communication terminal (e.g. a cell phone, a laptop etc.).

The communication network component is for example a component of the network side of a cellular radio communication system and the communication device is a for example a device on the terminal side of the cellular radio communication system. For example, the communication network component is for example a server (e.g. a gateway) in the core network of the cellular radio communication system, e.g. located at an entry point to the Internet or also at a connection point of the radio access network to the core network.

Figure 3:
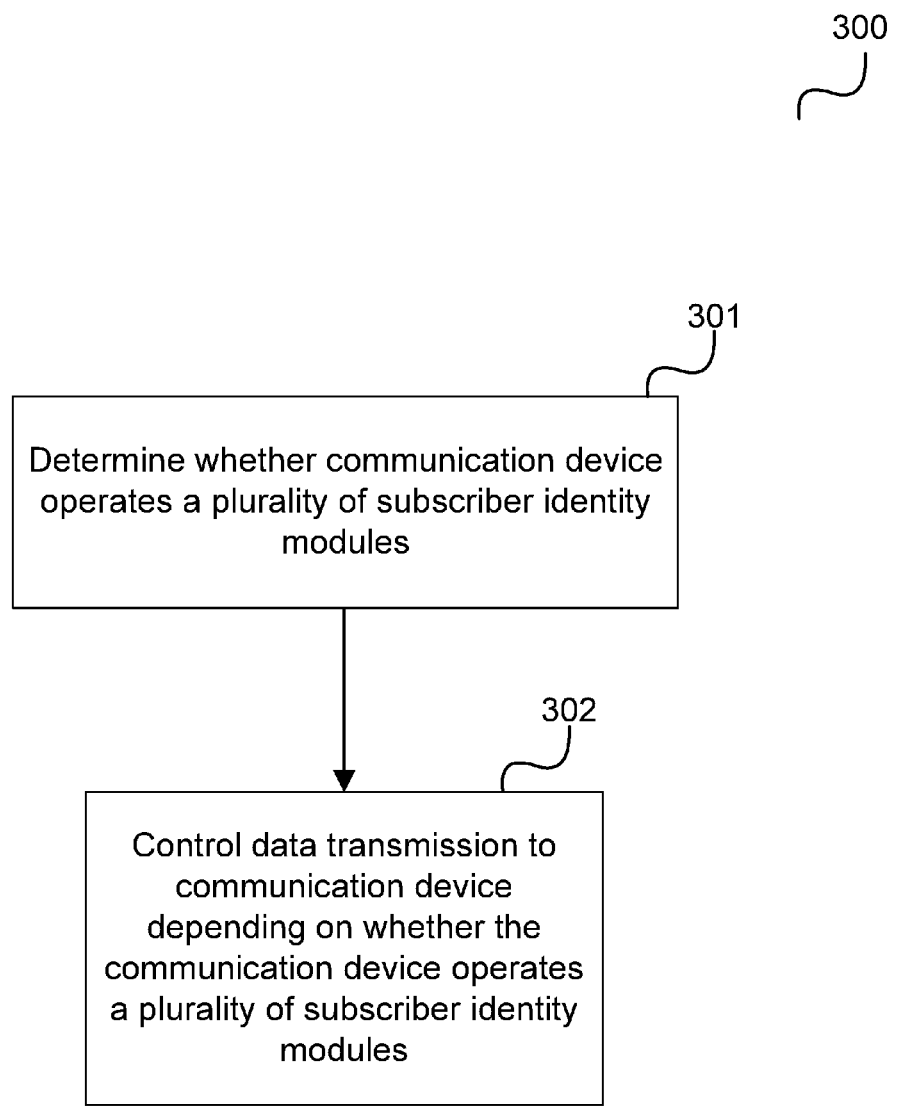
FIG. 3 shows a flow diagram illustrating a method for transmitting data.

The network communication component 200 for example carries out a method as illustrated in FIG. 3.

FIG. 3 shows a flow diagram 300.

The flow diagram 300 illustrates a method for transmitting data.

In 301, a device, e.g. a communication network component, determines whether a communication device operates (i.e. uses) a plurality of subscriber identity modules.

In 302, the device controls data transmission to the communication device depending on whether the communication device operates a plurality of subscriber identity modules. It should be noted that 301 may be carried out by a combination of network components. 302 is for example carried out by a single network component that does not carry out 301.

Figure 4:
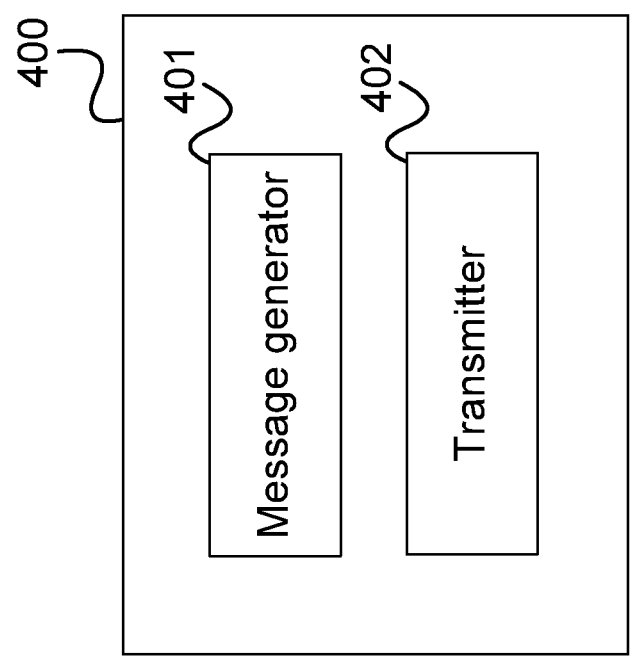
FIG. 4 shows a communication device indicating that it operates a plurality of subscriber identity modules.

The communication device may for example be a communication device as illustrated in FIG. 4.

FIG. 4 shows a communication device 400.

The communication device 400 includes a message generator 401 configured to generate a message indicating that the communication device operates a plurality of subscriber identity modules.

The communication device 400 further includes a transmitter 402 configured to transmit the message to a radio communication network.

Figure 5:
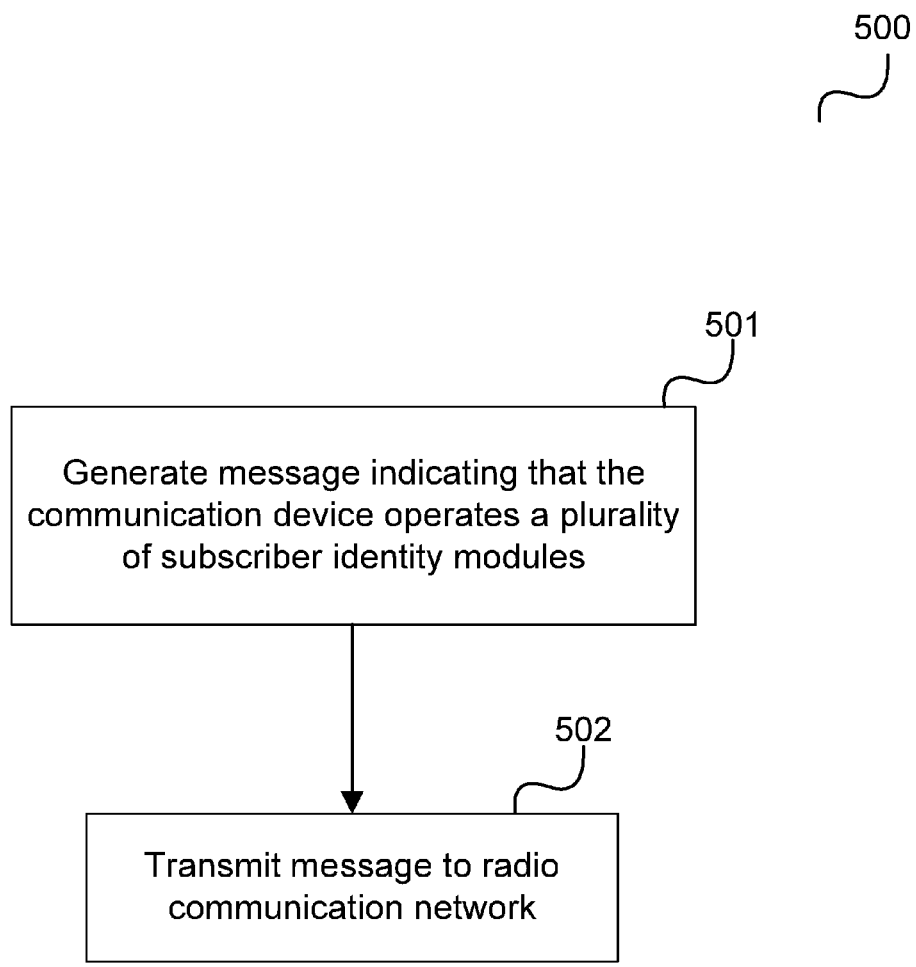
FIG. 5 shows a flow diagram illustrating a method for data communication.

The communication device 400 for example carries out a method as illustrated in FIG. 5.

FIG. 5 shows a flow diagram 500.

The flow diagram 500 illustrates a method for data communication.

In 501, a communication device generates a message indicating that the communication device operates a plurality of subscriber identity modules.

In 502, the communication device transmits the message to a radio communication network.

Figure 6:
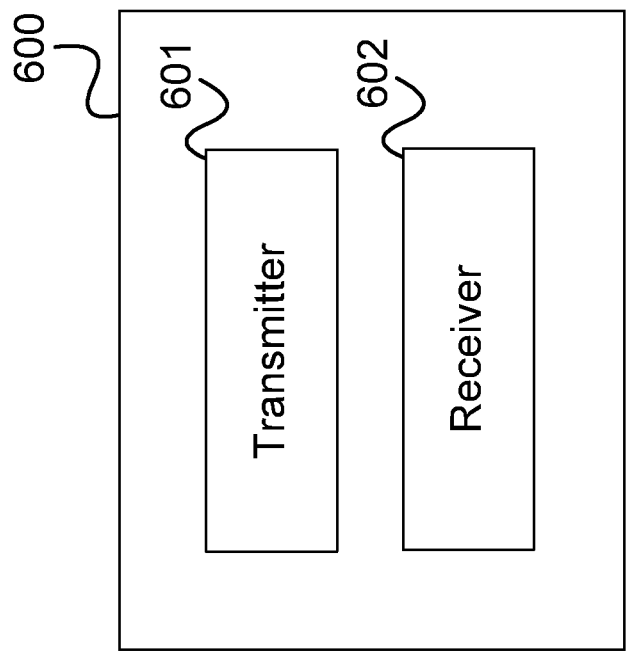
FIG. 6 shows a communication device indicating that a data transmission should be separated into a plurality of transmissions.

A further example for a communication device that may be provided is illustrated in FIG. 6.

FIG. 6 shows a communication device 600.

The communication device 600 includes a transmitter 601 configured to transmit a message indicating that a data transmission to the communication device should include successive transmissions of a plurality of data blocks, wherein between the transmissions of every two data blocks, there is a time interval of a predetermined minimum length.

The communication device 600 further includes a receiver 602 configured to receive the data transmission via a communication channel and to pause receiving via the communication channel during the time intervals between two data blocks and for example receive data via another communication channel in response to a corresponding configuration by the communication network used by the communication device.

In other words, a communication device may indicate that a data transmission should be separated into consecutive segments. Between two segments, the communication device 600 may for example listen to a paging channel of another radio communication network than the one to which the communication channel is established. This for example avoids that a user of a multi-SIM mobile device experiences drawbacks from lost service or lost incoming calls due to applications blocking the radio for many seconds or even minutes.

The receiver is for example configured to receive data via another communication channel during the time intervals between two data blocks.

Figure 7:
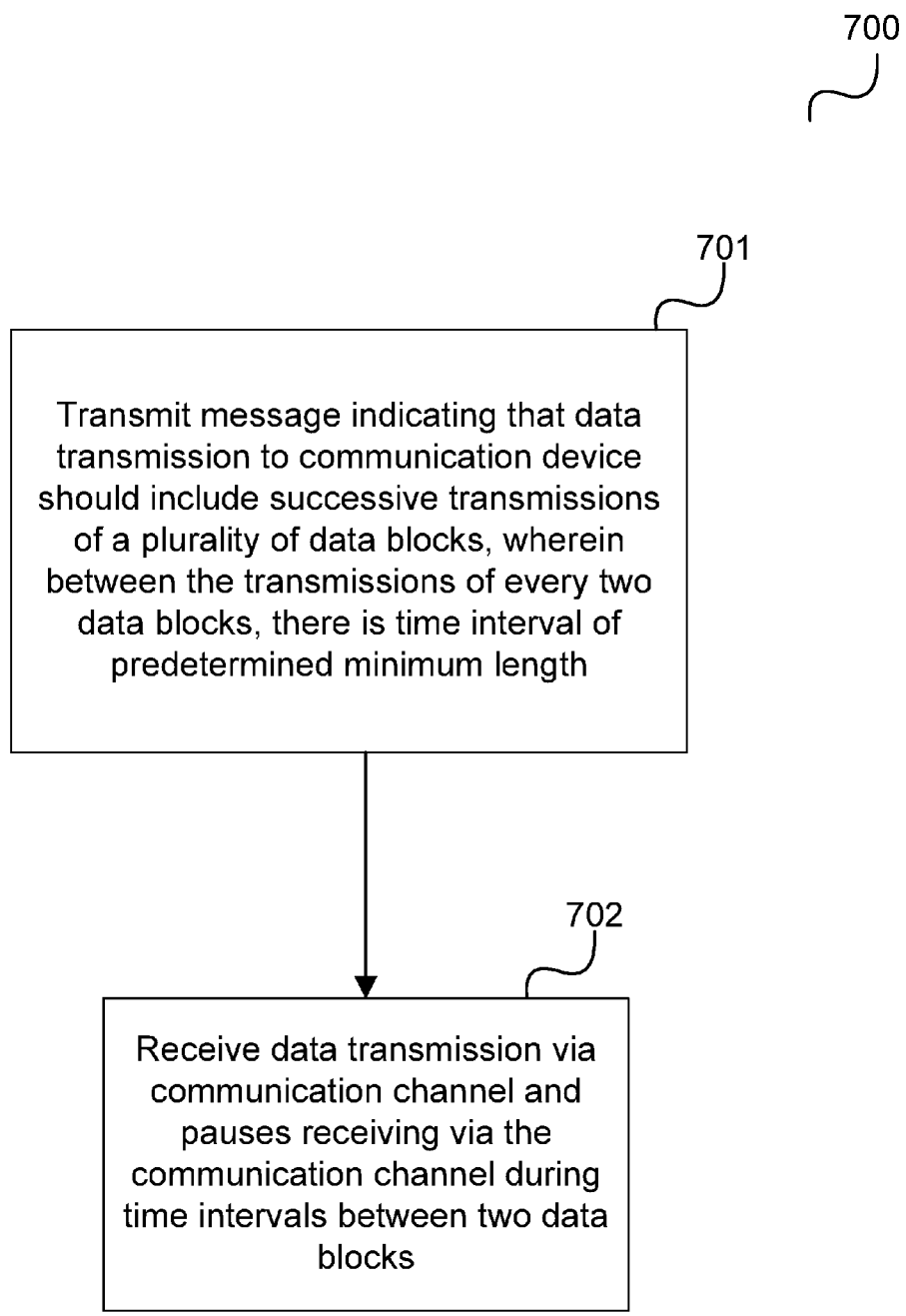
FIG. 7 shows a flow diagram illustrating a method for data communication.

The communication device 600 for example carries out a method as illustrated in FIG. 7.

FIG. 7 shows a flow diagram 700.

The flow diagram 700 illustrates a method for data communication.

In 701, a communication device transmits a message indicating that a data transmission to the communication device should include successive transmissions of a plurality of data blocks, wherein between the transmissions of every two data blocks, there is a time interval of a predetermined minimum length.

In 702, the communication device receives the data transmission via a communication channel and pauses receiving via the communication channel during the time intervals between two data blocks. This may be done in response to a corresponding indication from the communication network used by the communication device. In other words, the communication network may decide about the pausing and let the communication device know accordingly such that the communication device may pause reception and may for example use the pause for receiving via another communication channel.

For example, the transmitter is configured to transmit the message to a communication network and the receiver is configured to pause receiving via the communication channel during the time intervals between two data blocks in response to the transmission of an indication by the communication network that transmission via the communication channel is paused during the time intervals between two data blocks.

The receiver is for example configured to receive data via another communication channel during the time intervals between two data blocks in response to the transmission of an indication by the communication network that transmission via the communication channel is paused during the time intervals between two data blocks.

It should be noted that a communication network component corresponding to the communication device 600 may be provided, e.g. a communication network component that receives the message and controls a data transmission as indicated by the message.

It should be further noted that aspects and features described in context of any of the devices or methods illustrated in FIGS. 2 to 7 are analogously valid for the other devices and methods.

The components of the communication network component and the communication devices (e.g. determiner, controller, receiver, transmitter etc.) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

In the following, an example is described in more detail.

Figure 8:
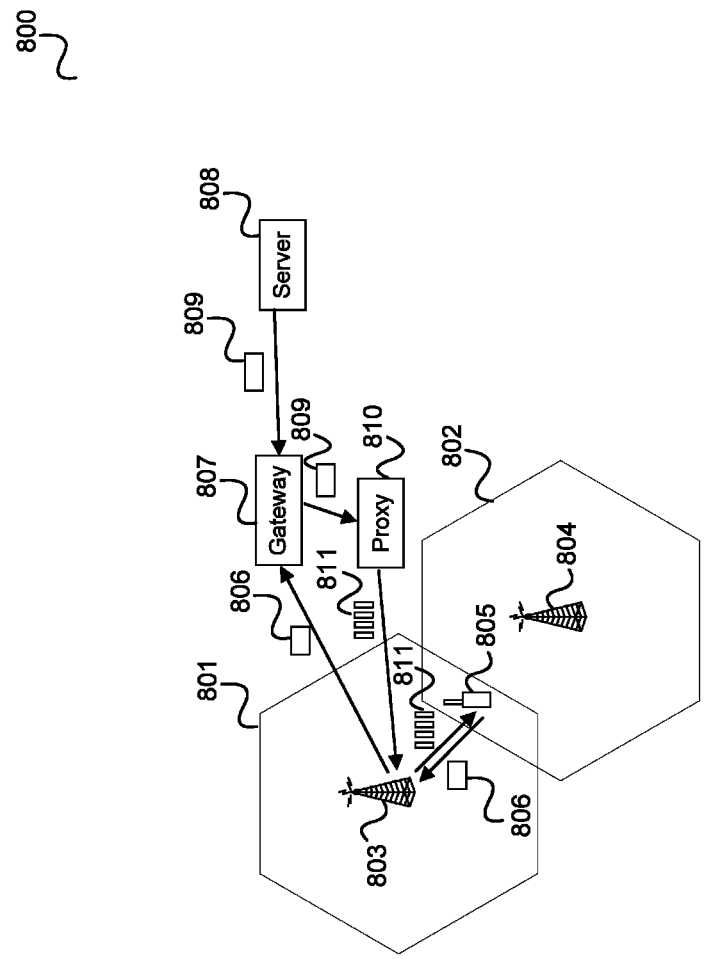
FIG. 8 shows a communication arrangement.

FIG. 8 shows a communication arrangement 800.

The communication arrangement 800 includes a first radio cell 801 operated by a first base station 803 and a second radio cell 802 operated by a second base station 804. The first radio cell 801 and the second radio cell 802 for example correspond to the radio cells 101, 102.

A communication device 805, e.g. a mobile communication terminal, is located in a region of overlap of the first radio cell 801 and the second radio cell 802.

The communication device 805 sends a message 806 to the first base station 801 which is forwarded to a network component, in this example a gateway 807, for example a serving gateway or a packet data gateway. The message 806 is for example transmitted via control plane signaling. By means of the message 806, the network (including the first base station 801 and the gateway 807) is made aware that the communication device 805 is using multiple SIM cards, i.e. that the device is a multi-SIM device. In response to the determination that the communication device 805 is a multi-SIM device, the network may adjust data traffic to the communication device 105.

For example, a server (e.g. an Internet server) 808 provides data 809 to be transmitted to the communication device 805 to the gateway 807.

The gateway 807 routes the data to a proxy 810. (It should be noted that also data received from the communication device 805 may be routed through the proxy 810). It should further be noted that the data may first be routed from the server 808 to the proxy 810 by a network component and then, for example, to the gateway 807, i.e. the functionality of routing the data to the proxy 809 does not need to be carried out by a gateway.

The proxy 810 can now take a decision on traffic shapes to optimize network load and end user experience. For example, the proxy 810 separates the data into a plurality of segments 811 which are consecutively transmitted to the communication device 805 via the first base station 801 wherein between the transmissions of every two segments there is a transmission break of a certain length.

It should be noted that the specific data path can be seen to be unimportant and can take several forms. In any case, in this example, one network component actively divides the data into suitable sizes, i.e. separates the data into a plurality of segments 811. This may actually be done by the base station 803 itself which combines radio resource knowledge with data size knowledge.

This is further illustrated in FIG. 9.

FIG. 9 shows a first transmission diagram 901 and a second transmission diagram 902.

The transmission diagrams 901, 902 illustrate transmissions along a time axes 903.

In the first transmission diagram 901, a long transmission 904 followed by two short transmissions 905 is illustrated. The length of the long transmission 904 may for example be so high that, if carried out for a SIM card of the communication device 805, would block paging for another SIM card of the communication device 805 such that the other SIM card misses an incoming call, or in case of repeatedly missing paging messages, loses its connection to the network. Accordingly, in this example, the proxy 810 separates the long transmission 904 into a plurality of transmission segments 907 which are followed by the short transmissions 905, 906. The transmission segments 907 are separated by time intervals 908 (i.e. every two segments 907 are at least separated by one of the time intervals 908).

The large transmission, i.e. a large download, may be separated into the segments 907 by breaking it into small packages on the air interface so the transmission time for all download packages (i.e. all segments 907) is kept under a pre-defined amount of time on the air interface. Such a pre-defined amount of time could be the length of the paging repetition interval times the number of repetitions of a paging message in the network. For example, if each paging message is repeated four times, the transmission time for each download package can last three times the paging repetition interval.

Further, also the time interval between two packages may be set to be longer than the paging repetition interval times the number of repetitions of a paging message such that it is ensured that the communication device can listen to at least one paging. For example, if the DRX is 5, meaning 1 seconds between paging messages and there are two SIMs in the communication device, the gap (i.e. the time interval between the transmission of two packages) should be at least 2 seconds. In any case, the interval is for example set to be at least 1 second. This way the download on one SIM card allows the other SIM card access to the radio after the pre-defined amount of time. This allows the other SIM card to stay in service on the network even while downloading large amount of data e.g. when a mail service is started and a large number of mails are downloaded to the communication device 805.

As another example, network (e.g. the gateway 807) may use knowledge of the communication device 805 being dual-SIM to collect a number of very small data packages into one larger data block, before sending it over the radio interface to the communication device 805. This avoids the other SIM losing connection often due to the a high number of small downloads.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication network component comprising:
   a determiner configured to determine whether a communication device operates a plurality of subscriber identity modules; and
   a controller configured to control data transmission to the communication device depending on whether the communication device operates a plurality of subscriber identity modules;
   wherein the controller is configured to in response to the determination that the communication device operates a plurality of subscriber identity modules, control a data transmission to the communication device to include the successive transmissions of a plurality of data blocks, wherein the length of each transmission has a predetermined maximum duration; and
   wherein the data transmission is a data transmission for one subscriber identity module of the plurality of subscriber identity modules and the predetermined maximum duration is the length of a paging repetition interval times the number of repetitions of a paging message associated with another of the subscriber identity modules of the plurality of subscriber identity modules.

2. The communication network component according to claim 1, further comprising a receiver configured to receive a message indicating whether the communication device operates a plurality of subscriber identity modules wherein the determiner is configured to determine whether the communication device operates a plurality of subscriber identity modules based on the message.

3. The communication network component according to claim 1, further comprising a receiver configured to receive a message indicating that the communication operates a plurality of subscriber identity modules wherein the determiner is configured to determine that the communication operates a plurality of subscriber identity modules in response to the reception of the message.

4. The communication network component according to claim 1, wherein the message is a control message.

5. The communication network component according to claim 1, wherein the controller is configured to control data transmission according to a predetermined criterion in response to the determination that the communication device operates a plurality of subscriber identity modules.

6. The communication network component according to claim 5, wherein the predetermined criterion depends on a characteristic of a radio communication network associated with one of the subscriber identity modules.

7. The communication network component according to claim 1, wherein the controller is configured to, in response to the determination that the communication device operates a plurality of subscriber identity modules, control a data transmission to the communication device to include the successive transmissions of a plurality of data blocks, wherein between the transmissions of every two data blocks, there is a time interval of a predetermined minimum length.

8. The communication network component according to claim 7, wherein the data transmission is a data transmission for one subscriber identity module of the plurality of subscriber identity modules and the predetermined minimum length is the length of the paging repetition interval times the number of repetitions of a paging message associated with another of the subscriber identity modules of the plurality of subscriber identity modules.

9. The communication network component according to claim 7, wherein the data blocks have a predetermined maximum transmission duration.

10. The communication network component according to claim 1, wherein the controller is configured to, in response to the determination that the communication device operates a plurality of subscriber identity modules, merge a plurality of shorter data transmissions to a larger data transmission.

11. The communication network component according to claim 1, wherein the controller is configured to, in response to the determination that the communication device operates a plurality of subscriber identity modules, control a data transmission to the communication device to be carried out via a proxy server.

12. The communication network component according to claim 1, wherein each subscriber identity module of the plurality of subscriber identity modules identifies the communication device as a subscriber of a radio communication network associated with the subscriber identity module.

13. The communication network component according to claim 12, wherein the radio communication networks associated with the subscriber identity modules of the plurality of subscriber identity modules are different or the subscriber identity modules are associated with the same radio communication network.

14. The communication network component according to claim 1, wherein the communication device is a communication terminal.

15. The communication network component according to claim 1, wherein the communication network component is a component of the network side of a cellular radio communication system and the communication device is a device on the terminal side of the cellular radio communication system.

16. A method for transmitting data comprising determining whether a communication device operates a plurality of subscriber identity modules; and
controlling a data transmission to the communication device depending on whether the communication device operates a plurality of subscriber identity modules;
controlling, in response to a determination that the communication device operates a plurality of subscriber identity modules, the data transmission to the communication device to include the successive transmissions of a plurality of data blocks wherein the length of each transmission has a predetermined maximum duration; and
wherein the data transmission is a data transmission for one subscriber identity module of the plurality of subscriber identity modules and the predetermined maximum duration is the length of a paging repetition interval times the number of repetitions of a paging message associated with another of the subscriber identity modules of the plurality of subscriber identity modules.

17. A communication device comprising:
a message generator configured to generate a message indicating that the communication device operates a plurality of subscriber identity modules; and
a transmitter configured to transmit the message to a radio communication network;
wherein one of the subscriber identity modules is associated with the radio communication network and the message indicates that the communication device operates, in addition to the subscriber identity module associated with the radio communication network, a subscriber identity module associated with another radio communication network;
wherein the transmitter is configured to, in response to the message indicating that the communication device operates a plurality of subscriber identity modules, control a data transmission to the communication device to include the successive transmissions of a plurality of data blocks, wherein the length of each transmission has a predetermined maximum duration; and
wherein the data transmission is a data transmission for one subscriber identity module of the plurality of subscriber identity modules and the predetermined maximum duration is the length of a paging repetition interval times the number of repetitions of a paging message associated with another of the subscriber identity modules of the plurality of subscriber identity modules.

18. A method for data communication comprising
a communication device generating a message indicating that the communication device operates a plurality of subscriber identity modules; and
the communication device transmitting the message to a radio communication network;
wherein one of the subscriber identity modules is associated with the radio communication network and the message indicates that the communication device operates, in addition to the subscriber identity module associated with the radio communication network, a subscriber identity module associated with another radio communication network;
wherein the communication device transmitting the message is configured to, in response to the message indicating that the communication device operates a plurality of subscriber identity modules, control a data transmission to the communication device to include the successive transmissions of a plurality of data blocks, wherein the length of each transmission has a predetermined maximum duration; and
wherein the data transmission is a data transmission for one subscriber identity module of the plurality of subscriber identity modules and the predetermined maximum duration is the length of a paging repetition interval times the number of repetitions of a paging message associated with another of the subscriber identity modules of the plurality of subscriber identity modules.

19. A communication device comprising
a transmitter configured to transmit a message indicating that a data transmission to the communication device should include successive transmissions of a plurality of data blocks, wherein between the transmissions of every two data blocks, there is a time interval of a predetermined minimum length;
a receiver configured to receive the data transmission via a communication channel and to pause receiving via the communication channel during the time intervals between two data blocks;
wherein the receiver is configured to, in response to the message indicating that a data transmission to the communication device should include successive transmissions of a plurality of data blocks, control the data transmission to the communication device such that the length of each transmission has a predetermined maximum duration; and
wherein the data transmission is a data transmission for one subscriber identity module of a plurality of subscriber identity modules and the predetermined maximum duration is the length of a paging repetition interval times the number of repetitions of a paging message associated with another of the subscriber identity modules of the plurality of subscriber identity modules.

20. The communication device according to claim 19, wherein the transmitter is configured to transmit the message to a communication network and wherein the receiver is configured to pause receiving via the communication channel during the time intervals between two data blocks in response to the transmission of an indication by the communication network that transmission via the communication channel is paused during the time intervals between two data blocks.

21. The communication device according to claim 20, wherein the receiver is configured to receive data via another communication channel during the time intervals between two data blocks in response to the transmission of an indication by the communication network that transmission via the communication channel is paused during the time intervals between two data blocks.

* * * * *